F. A. KENNEY.
MEANS FOR AUTOMATICALLY VARYING THE BRAKING POWER AS THE LOAD VARIES IN AUTOMATIC AIR BRAKE SYSTEMS.
APPLICATION FILED JULY 26, 1910.

994,320.

Patented June 6, 1911.

F. A. KENNEY.
MEANS FOR AUTOMATICALLY VARYING THE BRAKING POWER AS THE LOAD VARIES IN AUTOMATIC AIR BRAKE SYSTEMS.
APPLICATION FILED JULY 26, 1910.

994,320.

Patented June 6, 1911.

Witnesses
Otto E. Haddick
C. H. Roessner

Inventor
Frank A. Kenney
By O. F. O'Brien
Attorney

UNITED STATES PATENT OFFICE.

FRANK A. KENNEY, OF DENVER, COLORADO.

MEANS FOR AUTOMATICALLY VARYING THE BRAKING POWER AS THE LOAD VARIES IN AUTOMATIC AIR-BRAKE SYSTEMS.

994,320. Specification of Letters Patent. Patented June 6, 1911.

Application filed July 26, 1910. Serial No. 573,913.

*To all whom it may concern:*

Be it known that I, FRANK A. KENNEY, a citizen of the United States, residing in the city and county of Denver and State of Colorado, have invented certain new and useful Improvements in Means for Automatically Varying the Braking Power as the Load Varies in Automatic Air-Brake Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for automatically regulating and varying the braking power applied to a car, whereby this power is properly adapted for the car whether the same is loaded or unloaded. Under the system heretofore generally in vogue, it is well known that the braking power applied to a car is only that which is suitable for the car when light or unloaded, since if this power were greater in degree than is suitable for a light car, when the car is unloaded the braking power would be so great as to lock the wheels against turning or cause them to slide, resulting in "flat" wheels, and necessitating the sending of the car to the shop for repairs.

In my improved construction by virtue of a relatively simple expedient, it becomes practicable to have the normal braking power suitable for the car when loaded, this power, however, being automatically diminished or dissipated when the car is light or unloaded, so that under both circumstances the proper braking power is applied. That is to say, when the car is loaded a braking force is applied to the wheels, properly commensurate with the weight of the car with its load; while when the car is empty the braking force or power is diminished to such an extent that only sufficient braking force or power is employed as to properly hold the light car without sliding the wheels.

In my improved construction I employ a single supplemental reservoir so connected with the auxiliary reservoir of the regular air brake systems, that when the car is loaded a valve within the supplemental reservoir is actuated by the downward movement of the platform of the car incident to the yielding capacity of the springs, to open communication between the auxiliary reservoir and the supplemental reservoir so that both reservoirs are charged with air for braking purposes; while when the car is light or unloaded, the valve within the supplemental reservoir is moved to such a position that communication is cut off between the auxiliary and supplemental reservoirs, but opened between the supplemental reservoir and the brake cylinder, so that the air which enters the brake cylinder while sufficient to apply the brakes to a loaded car, is in part allowed to escape into the supplemental reservoir, the air chamber of which is equipped with a safety valve whose port is covered when the auxiliary and supplemental reservoirs are in communication, but which is uncovered when the brake cylinder and supplemental reservoirs are in communication. This safety valve may be so set that the pressure within the supplemental reservoir, and consequently within the brake cylinder, may be reduced to any predetermined degree that may be necessary and that may be adapted for applying the brakes to the light car.

Having briefly outlined my improved construction, I will proceed to describe the same in detail, reference being made to the accompanying drawing in which is illustrated an embodiment thereof.

In this drawing.

The same reference characters indicate the same parts in all the views.

Let the numeral 5 designate the bottom platform of a car and 6 the end trucks. The auxiliary reservoir 7, the brake cylinder 8, the train pipe 9, the branch pipe 10 and the triple valve 12 are ordinary elements of an air brake system, the Westinghouse system having been more particularly in mind and intended to be specifically illustrated in the drawing, though it must be understood that my improvement is equally applicable to both of the well known air brake systems now in use, namely, the Westinghouse and New York systems.

The rod or piston stem 13 of the brake cylinder is connected in the usual way with the levers 14 and 15 of the said mechanism, which will not be described in detail as nothing is claimed thereon.

Figures 3, 4, 5:
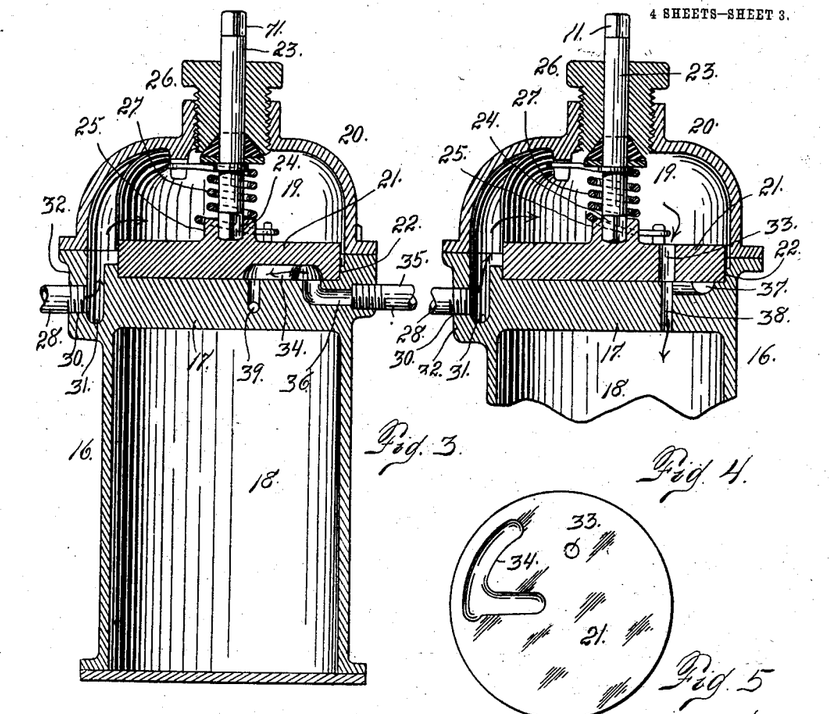
Fig. 3 is a sectional view illustrating the supplemental reservoir shown on a still larger scale. This view is a section taken on the line 3—3 Fig. 6.
Fig. 4 is a similar section of the supplemental reservoir showing the same partly broken away, the section being taken on line 4—4 Fig. 7.
Fig. 5 is an underneath view in detail of the supplemental reservoir valve shown on approximately the same scale as in Figs. 3, 4, 6 and 7.

Let the numeral 16 designate the supplemental reservoir of my improved construction, the same being provided with a heavy partition 17 (see Figs. 3 and 4), separating the main air chamber 18 from the valve chamber 19, which is inclosed by a head 20 which is secured to the body of the supplemental reservoir in any suitable manner. Located within the valve chamber 19 and engaging the outer face of the partition 17 is the valve 21 of the supplemental reservoir. This valve is seated within a circular recess 22 formed in the partition 17, being rotatably mounted in the said recess. A stem 23 is connected at one extremity with the valve as shown at 24, the inner extremity of the stem being formed angular in cross section to fit a socket of counterpart shape formed in a reinforced lug 25 with which the valve is provided. This stem protrudes through a stuffing box 26 with which the valve chamber head 20 is provided. Surrounding the stem within the valve chamber is a coil spring 27 which is interposed between the stuffing box and the valve. This spring performs a double function, namely, that of holding the valve 21 tightly against its seat, and also is under tension to normally hold the valve closed to cut off communication between the auxiliary reservoir and the main air chamber of the supplemental reservoir, so that in case the valve stem is disconnected from the operating gear of the car, it may be manually actuated to open communication between the auxiliary reservoir and the main air chamber of the supplemental reservoir. It will be noted that the outer extremity of the valve stem 23 is formed angular in cross section, whereby when it is disconnected from the operating mechanism as aforesaid, a wrench or other suitable tool may be readily applied thereto for manual operation.

Figures 6, 7:
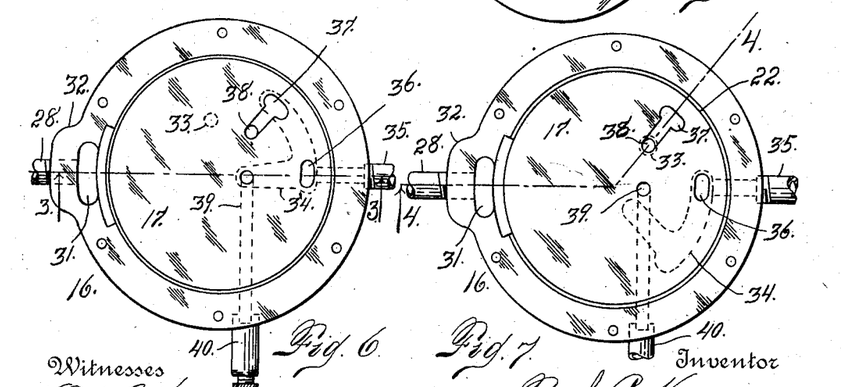
Fig. 6 is an end view of the supplemental reservoir with the valve and valve-chamber head removed, the port and cavity of the valve being indicated by dotted lines.
Fig. 7 is a similar view, in which it is assumed that the valve is in a different position from that assumed in Fig. 6, as indicated by the different locations of the dotted lines, which indicate the positions of the valve port and cavity respectively in the two views.

The auxiliary reservoir 7 is connected with the supplemental reservoir 16 by a pipe 28 which communicates at one extremity with the auxiliary reservoir as shown at 29, while its opposite extremity is in communication as shown at 30 with a passage 31 formed in the reinforced wall 32 of the supplemental reservoir adjacent the partition 17. This passage 31 communicates with the valve chamber 19. The valve 21 is provided with a port 33 extending therethrough and an angle-shaped cavity 34 formed in its under surface. When the valve is in its normal position or that shown in Fig. 3, the brake cylinder is in communication with the main air chamber 18 of the supplemental reservoir by way of a pipe 35, a passage 36 in the partition 17 of the supplemental reservoir, the cavity 34 of the valve 21, a cavity 37 of the partition 17, and an orifice 38 of the said partition. At the same time the air from the brake cylinder is allowed to pass from the cavity 34 of the valve 21 through a passage 39 of the partition 17 to a relief valve 40, which may be adjusted to reduce the air pressure within the brake cylinder and main chamber of the supplemental reservoir to any desired predetermined degree. Again when the valve 21 has changed its position by the lowering of the platform 5 as hereinafter described in detail, the parts will be in the relative position shown in Fig. 4, in which event the brake cylinder will be cut off from communication with the air chamber 18 of the supplemental reservoir, since the cavity 34 of the valve 21 will then be in the position indicated by dotted lines in Fig. 7, and while the air from the brake cylinder may enter the cavity 34 of the valve, it has no escape therefrom, since this cavity is cut off from communication with the relief valve passage 39 and also from the cavity 37 and port 38 of the partition 17. However, under these circumstances the port 33 of the valve is brought into register with the orifice 38 of the partition 17, whereby the air from the auxiliary reservoir passes freely through the pipe 28 into the passage 31 of the supplemental reservoir, the valve chamber 19, and thence directly through the port 33 and the orifice 38 to the air chamber 18 of the supplemental reservoir, whereby the two reservoirs are simultaneously charged with air for braking purposes, the air from both reservoirs being utilized in applying the brakes to the loaded car. Under these circumstances it will be understood, assuming a given travel for the piston 41 of the brake cylinder whereby a predetermined volume of the brake cylinder chamber is in communication with the air for braking purposes, that this volume of air required to fill the said portion of the brake cylinder when taken from the volume contained in the two reservoirs, will be maintained at a higher pressure for braking purposes than when taken from the auxiliary reservoir alone; and it is upon this principle that I obtain an increased braking power within the brake cylinder from a given pressure, as 70 pounds in the air line of the train. For instance, assuming that the pressure in the train pipe or air line of the train is 70 pounds, if there is a reduction of 10 pounds therein, the pressure within the auxiliary and supplemental reservoirs will be correspondingly reduced by the escape of air from said reservoirs through the triple valve and the pipe 42 of the auxiliary reservoir into the brake cylinder, and if it be assumed that the application of air for braking purposes is to the maximum degree, whereby the pressure in the supplemental and auxiliary reservoirs and the working volume of the brake cylinder becomes equal, it will be understood that this pressure is greater than under the old system, since the volume of air required to fill the working space of the brake cylinder is taken from a reservoir capacity as much greater than that of the regular auxiliary reservoir as is the volume of air within the main air chamber 18 of the supplemental reservoir. Hence it will be understood that by employing the supplemental reservoir I can obtain an increased braking force or pressure within the brake cylinder to any extent desired, by properly regulating the volume or size of the air chamber 18 of the supplemental reservoir, while the pressure in the air line or train pipe of the train remains the same.

Figure 1:
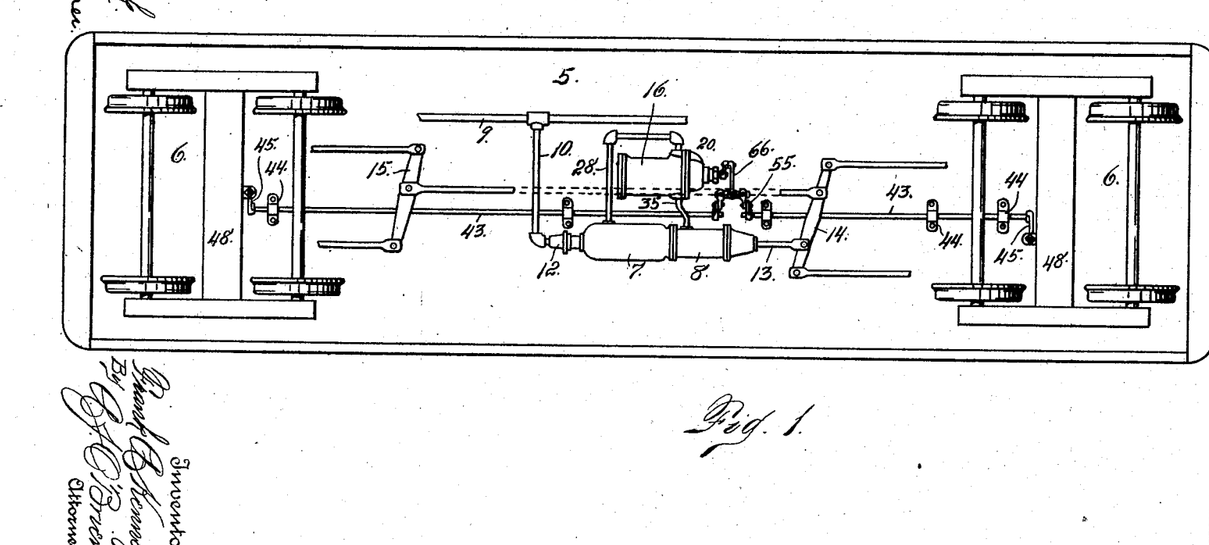
Figure 1 is an underneath view of the running gear of a car equipped with the Westinghouse air brake, and in connection with which my improvement is illustrated.
Figures 2, 11:
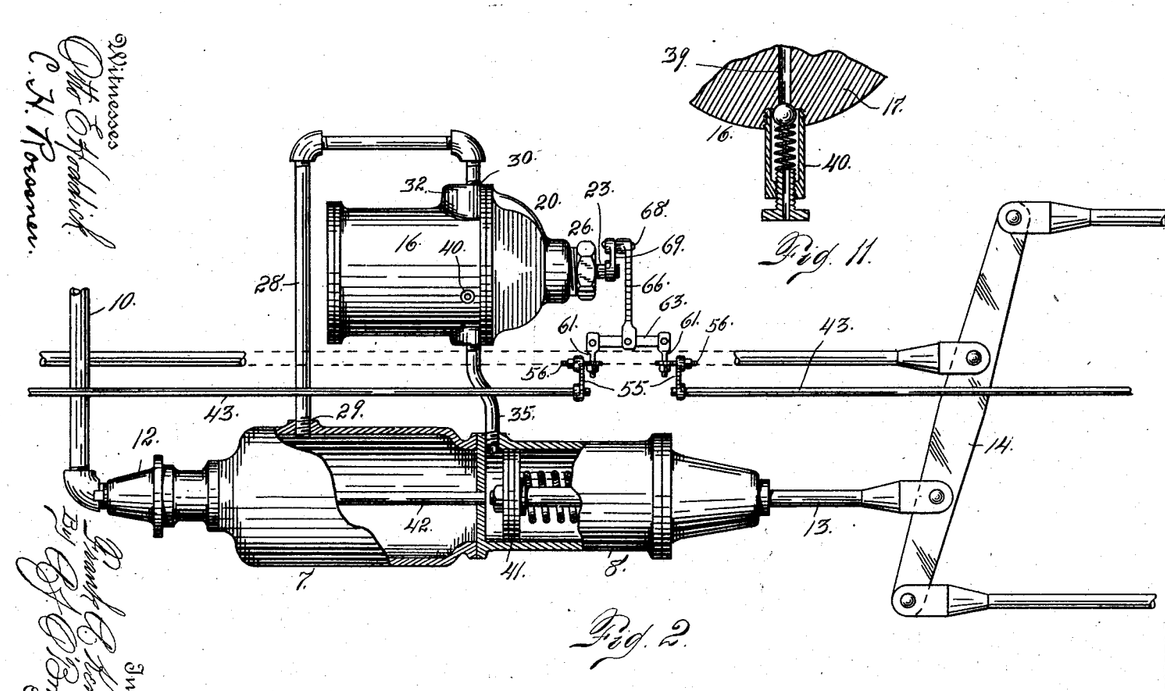
Fig. 2 is a view on a larger scale showing my improved supplemental reservoir connected with the auxiliary reservoir and brake cylinders, and also in connection with the means for operating the valve on the supplemental reservoir as the platform of the car fluctuates vertically.
Fig. 11 is a fragmentary sectional view in detail of the partition interposed between the valve chamber and the main air chamber of the supplemental reservoir, the section being taken through the safety or relief valve connected therewith.
Figure 8:
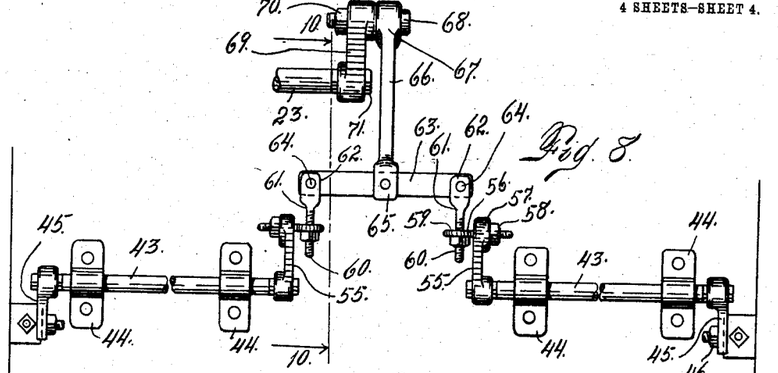
Fig. 8 is a top plan view in detail showing the mechanism interposed between the platform of the car and truck frame for operating the valve of the supplemental reservoir, the same being shown on a larger scale than in either Figs. 1 or 2.
Figure 9:
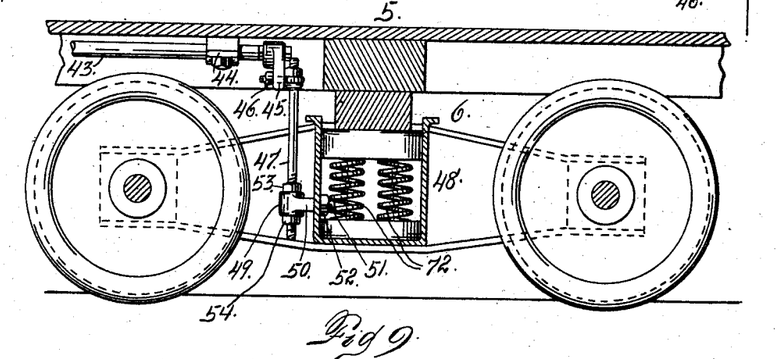
Fig. 9 is a section taken through one of the car trucks and the vertically reciprocable car platform mounted thereon.
Figure 10:
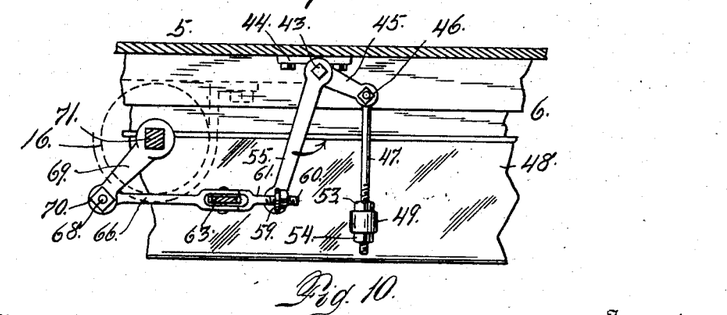
Fig. 10 is a section taken on the line 10—10 Fig. 8, looking toward the right or in the direction of the arrows adjacent said line.

The manner of operating the valve 21 of the supplemental reservoir by the vertical reciprocation of the platform or body of the car will now be described, though it must be understood that the invention is not limited to any particular or specific connection between the reciprocating car body and the valve stem, since I am aware that many different specific forms of construction may be successfully employed for accomplishing this object. However, referring now to the drawing (see Figs. 1, 2 and 8), two shafts 43 are journaled in bearings 44 secured to the bottom or undersurface of the platform of the car. To one extremity of each of these shafts is made fast a crank 45 whose opposite extremity is pivotally connected with a bolt 46 carried by the upper extremity of a vertically disposed rod 47 whose lower extremity is secured to the truck frame 48, the threaded extremity of the rod being passed through an eye 49 of an arm 50, to whose threaded extremity 51 a fastening nut 52 is applied. Nuts 53 and 54 are applied to the threaded extremity of the rod 47 both above and below the eye 49. To the opposite extremity of each shaft 43 is secured one end of a crank arm 55, whose opposite extremity is connected with a bolt eye 56, the end 57 of the crank being located between the nut 58 threaded on the bolt and the eye 59 of the latter. Through the eye 59 of this bolt is passed the threaded shank 60 of the bolt 61, having a flattened head 62 secured to a cross bar 63 by a suitable fastening device 64. To the center of this cross bar 63 is secured one extremity 65 of a connecting rod 66, having an eye 67 through which a bolt 68 is passed. To this bolt adjacent the eye, is secured one extremity of a crank arm 69 by a nut 70; while the opposite extremity of this crank arm is secured to the squared extremity 71 of the valve stem 23. From this description it will be understood that as the platform or body of the car 5 moves downwardly under the influence of the load, whereby the springs 72 of the truck are compressed, the two shafts 43 will turn in their bearings, and the crank arms 45 will turn on the bolts 46; but as the crank arms 45 and 55 are both fast on each shaft 43, any downward movement of the platform or body of the car must cause the crank arms 45 to turn on the pivot bolts 46 which are supported upon the truck frame; and when this occurs it will be understood, by an inspection of Fig. 10, that the lower extremity of the crank arm 55 must move toward the right or in the direction of the arrow in Fig. 10, whereby the crank arm 69 will be actuated to turn the stem 23 of the valve, the construction and arrangement of parts being such that the degree of movement given to the valve stem 23 will just be sufficient to bring the port 33 of the valve 21 into register with the orifice 38 of the partition 17 of the supplemental reservoir.

From the foregoing description the function as well as the operation of my improved mechanism will be readily understood. If it be assumed that the car is light or unloaded, whereby the platform 5 is supported by the truck springs 72 at its maximum height, from what has heretofore been stated it will be understood that the valve 21 of the supplemental reservoir will be in the position shown in Fig. 3, whereby communication is cut off between the auxiliary reservoir and the chamber 18 of the supplemental reservoir, and communication opened up between the brake cylinder and the chamber 18 of the supplemental reservoir, and also between the brake cylinder and the port 39 leading to the relief valve 40. Under these circumstances a portion of the air which enters the brake cylinder for braking purposes in response to the reduction of pressure in the train pipe, whereby the air from the auxiliary reservoir is allowed to enter the brake cylinder, will pass from the brake cylinder through the pipe 35, into the main air chamber 18, through the passage 36 of the partition 17, the cavity 34 of the valve 21, the cavity 37 of the partition 17 and the orifice 38 of the same partition. This air is also free to pass from the brake cylinder through the passage 36, the cavity 34 and the passage 39 to the relief valve 40, which may be set to reduce the pressure in the brake cylinder to any desired extent. Now when the car is loaded and the platform moves downwardly sufficiently to actuate the stem 23 of the valve 21 and turn the latter through the instrumentality of the crank 69, the connecting rod 66, the cross bar 63 and the elements 61, 56, 55, 43 and 45, the valve port 33 will be thrown into register with the orifice 38 of the partition 17, and when the auxiliary reservoir is charged with air for braking purposes, the air will also pass through the pipe 28, the passage 31, the valve chamber 19, the port 33 and the orifice 38, into the main air chamber 18 of the supplemental reservoir, whereby both reservoirs will be charged with air for braking purposes. Now when there is a reduction of air in the train pipe, the air will pass from the two reservoirs through the pipe 42 into the brake cylinder and the braking force applied to the piston of the cylinder will be commensurate with that required for the loaded car, for the reasons heretofore explained.

It must be understood that the brake rigging, including the levers, connecting rods and various appliances which form the connection between the brake cylinder piston and the brake shoes, must be so connected and arranged, where my improved apparatus is employed, that the braking power exerted for a given pressure on the piston of the brake cylinder, will be greater than when the usual or ordinary connections are employed.

As heretofore stated, the ordinary practice in vogue in air brake systems for cars, is to connect the brake rigging in such a manner that the pressure on the piston of the brake cylinder will apply the brakes with suitable force for use with empty cars. However, in order that my improved construction may be practicable, the brake rigging must be so connected that with the ordinary pressure in the brake cylinder, the braking power would be too great for empty cars. Hence it will be understood that in my improved construction, where the same is used in connection with loaded cars, I not only employ or obtain greater pressure in the brake cylinder for any given brake pipe pressure, but the brake rigging is also connected to give increased leverage for braking purposes, in proportion to the pressure on the piston of the brake cylinder, and it is for this reason that when the car is empty, it is necessary that a portion of the air which enters the brake cylinder, shall be allowed to pass into the supplemental reservoir, in order to reduce the pressure in the brake cylinder, which otherwise would be too great for use with empty cars. In other words, the brake rigging should be so arranged with reference to the leverage by which the braking power is exerted, that when the car is empty the brake cylinder pressure will exert a braking force equal to the regular percentage, say 70%, of the weight of the empty car. By this arrangement my improved apparatus makes it practicable to employ the necessary braking force for loaded cars, and a proportionate braking force for empty cars on the same train, whereby the braking force is approximately proportionately applied to all the cars whether loaded or empty, so that there will not be so much tendency on the part of the loaded and empty cars of the train to separate or pull apart as often happens under the present system, sometimes resulting in most serious accidents.

Having thus described my invention, what I claim is:

1. In means for automatically regulating the braking power in automatic air brake systems, to adapt said power for use on either loaded or empty cars, the combination with the car and air brake mechanism, of a supplemental reservoir, connections between said reservoir and the auxiliary reservoir, and between the supplemental reservoir and the brake cylinder, and a valve connected to be operated by the vertical fluctuation of the car body, to open communication between the supplemental reservoir and the auxiliary reservoir and cut off communication between the brake cylinder and the supplemental reservoir when the platform moves downwardly in response to the load, and to cut off communication between the two reservoirs and open communication between the supplemental reservoir and the brake cylinder when the platform moves upwardly.

2. In an apparatus of the class described, the combination with a car, an air brake mechanism, of a supplemental reservoir, a valve therein, a pipe connection between the supplemental reservoir and the auxiliary reservoir, and between the brake cylinder and the supplemental reservoir, and an operative connection between the vertically movable car body and the said valve, whereby the valve is normally held in position to open communication between the brake cylinder and the supplemental reservoir, but when the car body is moved downwardly in response to the load, the valve is actuated to cut off communication between the brake cylinder and the supplemental reservoir and open communication between the auxiliary reservoir and the supplemental reservoir, substantially as described.

3. In an apparatus of the class described, the combination with a car, an air brake mechanism thereon, of a supplemental reservoir divided by a suitable partition into a valve chamber and an air chamber, a valve located in said valve chamber, a pipe connection between the auxiliary reservoir and the supplemental reservoir, a pipe connection between the brake cylinder and the supplemental reservoir, and an operative connection between the said valve and the vertically movable car body, whereby as the car body moves downwardly under the weight of a load the valve is actuated to open communication between the auxiliary reservoir and the air chamber of the supplemental reservoir, and cut off communication between the brake cylinder and the air chamber of the supplemental reservoir, substantially as described.

4. The combination with a car, an air brake mechanism therefor, of a supplemental reservoir divided by a partition into an air chamber and a valve chamber, the valve being spring-held against the partition which forms its seat, the valve having a port and the partition an orifice arranged to be brought into register to open communication between the valve chamber and the air chamber, a pipe connection between the auxiliary reservoir and the valve chamber of the supplemental reservoir, and an operative connection between the said valve and the vertically movable car body, whereby when the car body is at its upward limit of movement, the port of the valve and the orifice of the partition are held out of register, whereby communication is cut off between the auxiliary reservoir and the air chamber of the supplemental reservoir, while when the car body moves downwardly in response to the weight of the load, the valve is actuated to bring the said port and the said orifice into register for the purpose set forth.

5. The combination with a car and air brake mechanism therefor, of a supplemental reservoir, a partition separating the said reservoir into a valve chamber and an air chamber, the said partition having an orifice, a valve seated on the partition and having a cavity in its inner surface, a pipe connection between the brake cylinder and a passage formed in the partition of the supplemental reservoir and communicating with the cavity of the valve, the cavity bringing the passage in the partition and the orifice of the partition into communication, to allow air to pass from the brake cylinder to the air chamber of the supplemental reservoir, and an operative connection between the valve and the vertically movable car body, whereby the aforesaid relation between the valve and partition is maintained, the valve, however, being actuated by the downward movement of the car body in response to the load, to cut off communication between the brake cylinder and the supplemental reservoir, substantially as described.

6. The combination with a car, and air brake mechanism therefor, of a supplemental reservoir comprising a valve chamber and an air chamber, the supplemental reservoir being in communication with the auxiliary reservoir and the brake cylinder respectively, a valve located in the valve chamber and an operative connection between the vertically movable car body and the said valve, whereby when the car is at its upward limit of movement the valve is held in position to cut off communication between the auxiliary reservoir and the supplemental reservoir, and to simultaneously open communication between the supplemental reservoir and the brake cylinder, while when the car body moves downwardly in response to the load the valve is actuated to open communication between the auxiliary reservoir and the supplemental reservoir, substantially as described.

7. The combination with a car and air brake mechanism therefor, of a supplemental air chamber, a pipe connection between the auxiliary reservoir and the said chamber, a pipe connected also between the air chamber and the brake cylinder, an interposed cut-off valve for regulating the passage of air from the reservoir to the chamber, and an operative connection between the valve and the vertically movable car body, whereby when the car body is at its upward limit of movement communication is cut off between the auxiliary reservoir and the supplemental air chamber and simultaneously established between the air chamber and the brake cylinder, while when the car body moves downwardly under the weight of the load, communication is opened between the auxiliary reservoir and the supplemental air chamber, substantially as described.

8. The combination with a car having a spring-supported, vertically movable body, of a supplemental reservoir comprising a valve chamber and an air chamber, the air chamber being in communication with the auxiliary reservoir and with the brake cylinder respectively, a valve located in the valve chamber for regulating the passage of air from the auxiliary reservoir and the air chamber of the supplemental reservoir, and an operative connection between the said valve and the car body, whereby when the latter is at one limit of its vertical movement the valve is held in position to cut off communication between the auxiliary reservoir and the air chamber of the supplemental reservoir and simultaneously open communication between the air chamber of the supplemental reservoir and the brake cylinder, while when the car body is at its opposite limit of vertical movement the valve will be held in position to open communication between the auxiliary reservoir and the air chamber of the supplemental reservoir and simultaneously cut off communication between the brake cylinder and the air chamber of the said reservoir, substantially as described.

9. The combination with a car having a spring supported vertically reciprocable body, and air brake mechanism carried by the car, of a supplemental reservoir comprising an air chamber and a valve chamber, the valve chamber being in constant communication with the auxiliary reservoir, a valve located in the valve chamber for regulating the passage of air from the auxiliary reservoir to the air chamber of the supplemental reservoir, the said valve being provided with a stem protruding from the valve chamber, a spring located in the valve chamber for maintaining the valve on its seat, and an operative connection between the valve stem and the vertically movable car body, to hold the valve in position to cut off communication between the auxiliary reservoir and the air chamber of the supplemental reservoir when the car body is at one limit of vertical movement, and to hold the valve in position to open communication between the auxiliary reservoir and the air chamber of the supplemental reservoir when the car body is at its opposite limit of vertical movement, substantially as described.

10. The combination with a car having a spring-supported vertically movable body, and air brake mechanism mounted thereon, of a supplemental reservoir having an air chamber, an air passage between the brake cylinder and the said air chamber, the said air chamber also being in communication with the auxiliary reservoir, a valve, and an operative connection between the valve and the vertically movable car body, to hold the valve in position to cut off communication between the said air chamber and the brake cylinder and simultaneously open communication between the air chamber and the auxiliary reservoir when the car body is at one limit of vertical movement, and open communication between the said air chamber and the brake cylinder when the car body is at its opposite limit of vertical movement, substantially as described.

11. The combination with a car having a spring-supported vertically movable body and air brake mechanism mounted thereon, of a supplemental reservoir having an air chamber in communication with the brake cylinder, and a valve for controlling the flow of fluid through said passage, the said valve being located in a chamber forming a part of the supplemental reservoir and having a stem protruding from said chamber, and an operative connection between the valve stem and the vertically movable car body, to actuate the valve to cut off communication between the brake cylinder and the air chamber of the supplemental reservoir when the car body is at one limit of vertical movement, and to open communication between the said cylinder and the said air chamber when the car body is at its opposite limit of vertical movement, substantially as described.

12. The combination with a car having a spring-supported vertically movable body, air brake mechanism mounted thereon, of a supplemental reservoir having an air chamber in communication with the brake cylinder, a safety valve mounted on the supplemental reservoir and forming communication between the brake cylinder and the atmosphere, a valve for controlling the passage of fluid to the said air chamber and to the relief valve, and an operative connection between the said valve and the car body, to maintain the valve in position to cut off communication between the brake cylinder and the air chamber of the supplemental reservoir, and between the brake cylinder and the safety valve, when the car body is at one limit of vertical movement, and open communication between the brake cylinder and the said air chamber and relief valve when the car body is at its opposite limit of vertical movement, substantially as described.

13. The combination with a car, and air brake mechanism mounted thereon, of a supplemental reservoir having an air chamber in communication with the auxiliary reservoir and the brake cylinder, respectively, a valve operable to cut off communication between the auxiliary reservoir and the said air chamber, and simultaneously open communication between the brake cylinder and the said air chamber, and also to open communication between the auxiliary reservoir and the said air chamber and simultaneously cut off communication between the brake cylinder and the said air chamber, substantially as described.

14. The combination with a car and air brake mechanism mounted thereon, of a supplemental reservoir having an air chamber, a valve carried by said reservoir, the said air chamber being in communication with the auxiliary reservoir and with the brake cylinder by a suitable passage, and a valve carried by the supplemental reservoir and operable to alternately establish communication between the said air chamber and the auxiliary reservoir and brake cylinder, substantially as described.

15. The combination with a car having a spring-supported vertically movable body, and air brake mechanism mounted thereon, of a supplemental reservoir having an air chamber adapted to communicate with the auxiliary reservoir and with the brake cylinder, and a valve carried by the supplemental reservoir and connected in operative relation with the car body, for operating the valve to alternately place the said air chamber in communication with the auxiliary reservoir and the brake cylinder when the car body is respectively at its opposite limits of vertical movement, substantially as described.

In testimony whereof I affix my signature in presence of two witnesses.

FRANK A. KENNEY.

Witnesses:
  A. J. O'BRIEN,
  E. J. BOWEN.

---

Copies of this patent may be obtained for five cents each, by addressing the "Commissioner of Patents, Washington, D. C."